Sept. 15, 1970   R. P. ATKINSON   3,528,711
BEARING LUBRICATION
Filed Sept. 3, 1968

INVENTOR.
Robert P. Atkinson
BY
Paul Fitzpatrick
ATTORNEY

United States Patent Office 3,528,711
Patented Sept. 15, 1970

3,528,711
BEARING LUBRICATION
Robert P. Atkinson, Indianapolis, Ind., assignor to General Motors Corporation, Detroit, Mich., a corporation of Delaware
Filed Sept. 3, 1968, Ser. No. 757,068
Int. Cl. F16c 1/24
U.S. Cl. 308—187            14 Claims

ABSTRACT OF THE DISCLOSURE

A rolling contact bearing has an inner race which defines a continuous slit orifice around the race through which oil is introduced to lubricate the bearing. In a ball bearing this orifice is in the radial plane of the centers of the balls. In a roller bearing, there are two such orifices, one at each end of the inner race next to the flanges of the race. The orifice is fed from a pocket containing oil under pressure due to centrifugal force which is supplied from within the inner race. A similar structure provides lubrication between a race and a spacer which rides on it.

---

My invention relates to rolling contact bearings such as ball and roller bearings and particularly to an improved means of lubrication for such bearings.

My invention finds particular application in large ball or roller bearings operating at high speeds such as are found, for example, in gas turbine engines. These bearings operate at high angular and linear velocities and are of such large size that the centrifugal forces are very substantial; also, the load carried by the bearing may be high at times. Improvements in lubrication are greatly needed to lengthen the service life of bearings in such installations.

According to my invention, oil is supplied to the rolling elements of the bearing through a very narrow continuous slit or annular orifice so that the lubrication is continuous rather than discontinuous, with oil entering the bearing in one or more distinct jets. In this way, a continuous thin film of oil can then be applied to the rolling elements so that there is highly adequate lubrication without an excess of oil which creates pumping problems as the balls or rollers traverse the races. Preferably, the oil is fed to the slit orifice from an annular or toroidal pocket in which the oil is contained under pressure due to the supply pressure of the oil or to centrifugal force or to both, as may be desired. In the usual installation with a rotating inner race there will be centrifugal force acting on the oil in such a pocket. The annular pocket may distribute the oil over the entire circumference of the inner race while being supplied through a small number of entrance ports from the interior surface of the race.

The nature of my invention and the advantages thereof will be made clear to those skilled in the art from the succeeding detailed description of preferred embodiments of the invention and the accompanying drawings thereof.

Figure 1:
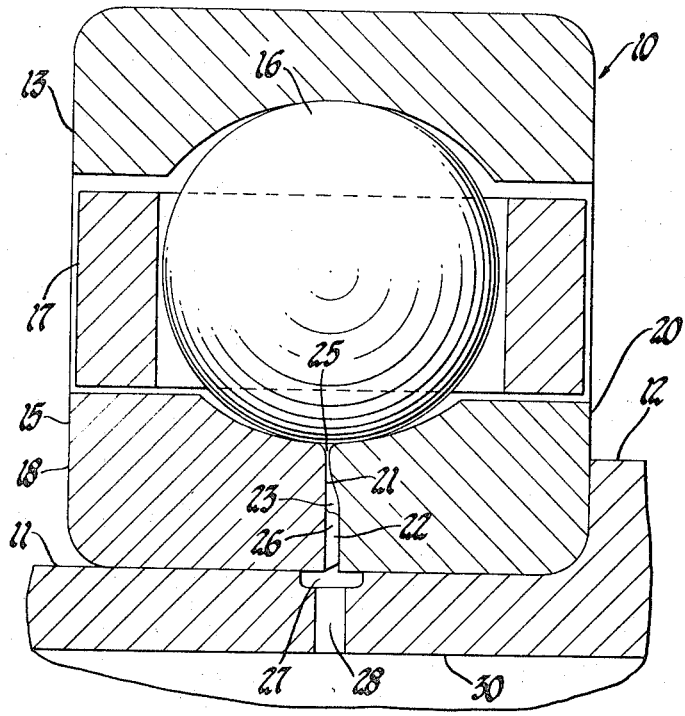
FIG. 1 is a sectional view through a ball bearing taken on a plane containing the axis of the bearing.

Referring first to FIG. 1, a ball bearing 10 is illustrated as mounted on a hollow shaft 11, the center line of which is not illustrated, abutting a flange 12 extending from the shaft. The bearing comprises the usual outer race 13, an inner race 15, a number of bearing balls 16 engaging the two races, and a suitable separator 17 acting to locate the balls circumferentially of the races. The inner race 15 is made up of two rings 18 and 20 which may be identical but which as shown are slightly different in structure. Any suitable retainer (not illustrated) may bear against ring 18. As illustrated, the ring 18 has an inner face 21 substantially in the plane of the centers of the balls 16 which has projecting from it a flange 22. The inner face of ring 20 bears against flange 22 and the radially outer part of this face overhangs toward ring 18 so that between the two rings a pocket 23 for lubricating oil is provided. The converging faces define a very narrow slit or hairline orifice 25 extending entirely around the circumference of the inner race. A suitable number, such as four to six, of passages 26 to supply oil to the pocket 23 are defined by grooves in flange 22. These passages communicate with an annular recess 27 in the outer surface of shaft 11 which in turn communicates through one or more ports 28 with the bore 30 in the interior of shaft 11.

Any suitable means may be provided to supply oil to the ports 28, either under pump pressure or merely flowing along the wall of the shaft to the ports to be ejected into the bearing by centrifugal force. Illustrative prior art oil circulating systems for gas turbines may be seen in U.S. patents to Gaubatz et al., No. 2,693,248 for Lubrication System, Nov. 2, 1954; Wheatley, No. 2,804,280 for Turbine Bearing Lubrication System, Aug. 27, 1957; and Atkinson et al., No. 2,964,132 for Lubrication System for a Turbine Engine, Dec. 13, 1960.

The oil thus supplied accumulates in the pocket 23 and is urged toward the outer radius of the pocket by centrifugal force. It may be metered at any point, as for example, in the slots 26 or in the orifice 25, or both. Orifice 25 should in any case restrict flow sufficiently to assure retention of a 360° ring of oil in pocket 23 so that all the orifice 25 is supplied with oil. Flow through orifice 25 will depend upon the dimensions of the orifice, rate of rotation of the bearing, the depth of the contained annulus of oil, and any static pressure exerted upon the oil by the source; and the characteristics of the oil. For any given installation these parameters may be related to achieve a sufficient but not excessive flow of oil from slit orifice 25 distributed entirely around the inner race. There are so many factors involved the dimension of orifice 25 cannot be specified but, in general, it should be of the order of one to five thousandths inch. The oil discharged from orifice 25 is picked up by the balls and carried to the outer race where it also lubricates the contact between the balls and the outer race. Also, the oil would serve to lubricate the contact between the balls and separator.

Figure 2:
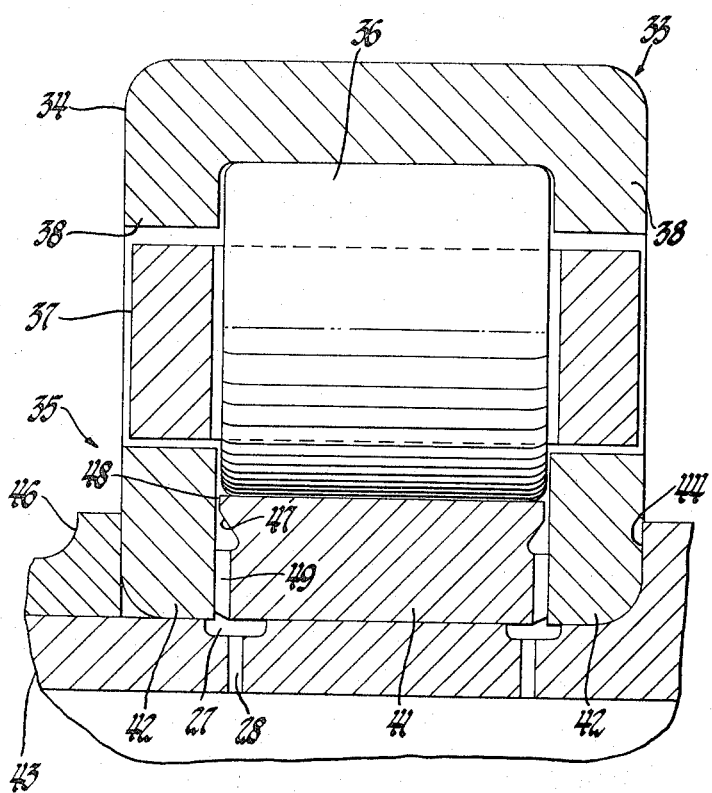
FIG. 2 is a similar sectional view of a roller bearing.

FIG. 2 shows the application of the principles of the invention to a roller bearing 33. This roller bearing, apart from the improved lubrication system, may be of a conventional type comprising an outer race 34, an inner race 35, a number of rollers 36, and a separator 37. The outer race is integral and may include flanges 38. The inner race is in three parts; an annular roller track 41 and two flanges 42 which may be identical. As shown, the flanges 42 have plane inner faces against the radially outer portion of which the rollers may engage. The bearing is shown mounted on a shaft 43 defining a shoulder 44 against which one end of the race is pressed by any suitable retaining ring 46. In the roller bearing of FIG. 2, the structure for admission and distribution of oil to the bearing is at each end of the roller track 41 and, as shown, is defined in the end faces of the roller track although it could be defined in the flanges 42 or partially in each.

Each end of roller track 41 is recessed to define an oil pocket 47 converging at its outer diameter to a narrow slit orifice 48 directed radially of the shaft 43. A number of passages 49 are defined by slots in the inner portion of the face of the roller track. As in the form of FIG. 1, these conduct oil from recesses 27 in the outer surface of the shaft 43 which are supplied through ports 28. In this form, the oil enters the oil pockets 47 and is distributed in an annulus completely around the circumference of the bearing at each end of the roller track and it is thrown outward at high velocity by centrifugal force aided by static pressure if present. As a result, the oil engages the roller through its entire circumference of the bearing and particularly provides 360° lubrication of the thrust faces of rings 42 which are engaged by the rollers. The thin stream is fed outward to the outer race by the face or end of the rollers, and the oil also is distributed by the rollers on the cylindrical faces of the roller track and outer race.

Figure 3:
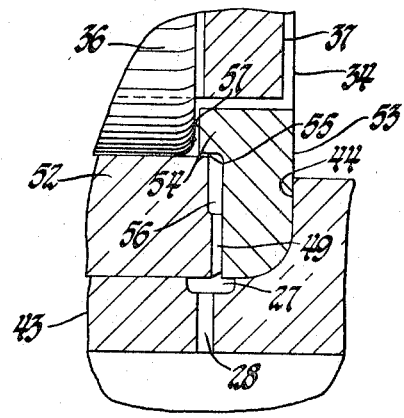
FIG. 3 is a partial view illustrating a modification of the roller bearing structure of FIG. 2.

FIG. 3 illustrates a development of the structure of FIG. 2 to improve the distribution of oil to the contact between the cylindrical outer surface of the outer rollers and the races or tracks. The structure here is similar to that of FIG. 2 except as illustrated, the difference being in the arrangement of the oil discharge orifice between roller track 52 and each flange 53. In this structure, the flange 53 includes an overhanging lip 54 which extends over the end of roller track 52, thus defining between them an annular orifice 55 parallel to the axis of the bearing. Thus, in this form, the oil which is fed to oil pocket 56 is ejected by centrifugal force at high velocity parallel to the axis of the bearing on to the inner race 52, with centrifugal force causing the oil to divert to some extent into a radial direction over the thrust face 57 of flange 53.

Figure 4:
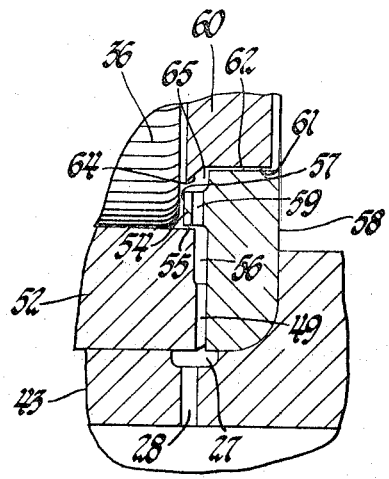
FIG. 4 is a partial sectional view illustrating means for lubricating a sliding bearing between the inner race and the separator of a bearing.

FIG. 4 shows the principles of my invention applied to lubricating a sliding contact bearing between the inner race of a ball or roller bearing and a separator. The structure is shown as applied in a bearing otherwise similar to that of FIG. 3 but it could be incorporated in other bearings, or independently of the arrangement for lubricating the ball or roller track of the bearing. In FIG. 4, the inner race flange 58 is provided with a number, preferably four to six, of small radial holes 59 through the overhanging lip 54. The separator 60 has a preferably cylindrical radially inner surface 61 which rides with very slight clearance on the outer surface 62 of flange 58. An inwardly directed lip 64 on separator 60 defines between it and ledge 54 an oil pocket 65. Oil delivered through the holes 59 to pocket 65 can build up some centrifugal force and flow axially of the bearing through the clearance between the surfaces 61 and 62. Thus, suitable means are provided for lubricating the sliding bearing between the inner race and the separator by means which supplies oil entirely around the periphery of the bearing. The hole or holes 59 should be small enough to meter oil to pocket 65 so that it does not overflow the lip 64.

It will be apparent to those skilled in the art that my invention provides superior means for lubrication of rolling contact bearings particularly suitable to large high speed bearings. It also provides a simple and economically feasible way of providing oil flow through 360° slit orifices to provide a continuous supply of oil to the rolling elements. Moreover, it may embody improved means for lubricating a sliding contact between a separator and a race of a roller contact bearing.

It is clear that parts such as rings 18 and 20 or 41 and 42 may be in abutting relation although the abutting relation is carried through some intermediate part; therefore, the term "abutting" in the claims does not exclude the presence of some intermediate part as long as the parts are abutted together to control the width of the orifices.

The detailed description of preferred embodiments of the invention for the purpose of explaining the principles thereof is not to be considered as limiting or restricting the invention, as many modifications may be made by the exercise of skill in the art.

I claim:
1. A rolling contact bearing comprising, in combination, an outer race, an inner race, and rolling bodies of revolution in rolling contact with both races, the inner race comprising two coaxial rings disposed side by side including parts in abutting relation, the rings being configured to define between them an annular oil pocket, an annular slit orifice connecting the pocket to the outer surface of the inner race adjacent the said rolling bodies, and at least one oil entrance into the said pocket, the pocket and orifice being configured to contain a rotating annulus of oil, replenished through the entrance and discharged through the orifice, in normal operation of the bearing.

2. A bearing as recited in claim 1 in which the rolling bodies are balls.

3. A bearing as recited in claim 2 in which the centers of the balls and the orifice lie substantially in a common plane.

4. A bearing as recited in claim 1 in which the rolling bodies are rollers.

5. A bearing as recited in claim 4 in which one of the said rings is a roller track and the other is a flange.

6. A bearing as recited in claim 5 including also a third ring defining a second flange and structure defining an oil pocket, slit orifice, and oil entrance between the roller track and third ring.

7. A bearing as recited in claim 5 in which the rings are configured so that the said slit orifice discharges radially of the bearing.

8. A bearing as recited in claim 5 in which the rings are configured so that the said slit orifice discharges axially of the bearing.

9. A bearing as recited in claim 8 in which the orifice is defined between the outer surface of one ring and an overhanging lip on the other ring.

10. A bearing as recited in claim 1 in which the pocket and orifice are defined between converging end surfaces of the rings, and one ring includes a flange directly abutting the other ring and having at least one opening through the flange defining the oil entrance.

11. A rolling contact bearing comprising, in combination, an outer race, an inner race, and rollers in rolling contact with both races, the inner race comprising a roller track and two flanges coaxial with the roller track disposed side by side including parts in abutting relation, the roller track and flanges being configured to define between them an annular oil pocket at each end of the roller track, an annular slit orifice connecting each pocket to the outer surface of the inner race, and at least one oil entrance into each said pocket, each pocket and orifice being configured to contain a rotating annulus of oil, replenished through the entrance and discharged through the orifice, in normal operation of the bearing.

12. A bearing as recited in claim 11 in which the orifices open radially to discharge radially along the surface of the flanges.

13. A bearing as recited in claim 11 in which each flange includes a lip overhanging the roller track and defining with it an axially-directed orifice.

14. A bearing as recited in claim 11 including also a separator in sliding contact with the inner race and means for supplying oil from the said pockets to the interface between the inner race and separator.

References Cited
UNITED STATES PATENTS

| | | | |
|---|---|---|---|
| 2,217,801 | 10/1940 | Katcher | 308—187 |
| 2,977,161 | 3/1961 | Cobb | 308—187 |
| 2,983,557 | 5/1961 | Blinder | 308—187 |
| 3,243,243 | 3/1966 | Diser et al. | 308—187 |

MARTIN P. SCHWADRON, Primary Examiner

F. SUSKO, Assistant Examiner